United States Patent [19]

Ray

[11] 4,344,643
[45] Aug. 17, 1982

[54] WHEEL SUSPENSION ASSEMBLY FOR A TRAILER

[76] Inventor: Earl B. Ray, 103 Glendale Ave., Huntington, W. Va. 25705

[21] Appl. No.: 188,990

[22] Filed: Sep. 22, 1980

[51] Int. Cl.³ .............................................. B60G 11/16
[52] U.S. Cl. .................................... 280/724; 280/725
[58] Field of Search ............... 280/688, 666, 667, 670, 280/672, 698, 701, 702, 705, 709, 711, 713, 724, 725, 788, 789; 267/66

[56] References Cited

U.S. PATENT DOCUMENTS

| | | | |
|---|---|---|---|
| 1,601,939 | 10/1926 | Carroll | 280/788 |
| 2,933,328 | 4/1960 | McIntyre | 280/788 |
| 3,356,386 | 12/1967 | Taylor | 280/724 |
| 3,666,288 | 5/1972 | Carton | 280/713 |

Primary Examiner—Robert R. Song

Attorney, Agent, or Firm—William F. Frank

[57] ABSTRACT

A wheel suspension assembly for a trailer comprising a pair of support plates, the upper end portion of each to be attached to a trailer frame, the lower end portions being connected by a fixed pivot pin a substantially rectilinear support frame having its forward end pivotally mounted on said pivot pin and extending rearwardly therefrom under the trailer frame to its end portion where load cushioning means interact between the trailer frame and the end of the support frame. At least one two-wheel-axle assembly is secured to the support frame at a distance from the pivot pin which is one-third of the length of the support frame. The suspension is attached by the support plates to the trailer frame at a point so that the centerline of the wheel assembly is under the center of the longitudinal axis of the trailer frame.

4 Claims, 4 Drawing Figures

WHEEL SUSPENSION ASSEMBLY FOR A TRAILER

FIELD OF INVENTION

The present invention is in the field of trailers, and more particularly in the suspension systems for two wheeled trailers.

BACKGROUND OF THE INVENTION

Wheel suspension systems for two wheeled trailers have generally in the past limited the capacity of the trailers to the load capacity of the springs. It is well accepted that the actual trailer frame and body can be made strong enough to retain the weight. Similarly the wheel and axle can be made strong enough to support the load. The problem is vested with the capacity of the springing or suspension system of the wheels to the trailer frame. It has been common to use ordinary leaf springs arranged transverse to the axle and parallel to the trailer frame. Use has also been made of coil springs in lieu of the leaf springs with the coil springs mounted on the axle. It has also been known to mount the coil springs on stub axle for each wheel so that each wheel, in effect, is individually sprung and attached to the wheel frame. It has also been known to suspend the axle from an axle support frame which is pivotally attached to the trailer frame forward of the wheels with a coil spring arrangement at the rear. In this latter system the coil spring has been encased in a housing which is enclosed except for a slot in which the axle support arm on each side travels upwardly within the housing leaving an opening in the housing below the support arm which can collect soil, debris, and so forth when a load is placed on the trailer.

In these previous suspension systems the capacity of the trailer was dependent entirely upon the strength of the spring, that is, the heavier the load to be carried, the heavier the spring had to be in order to accept a load and at the same time provide some resiliency in the support system to compensate for irregularities in highways or in the ground over which the trailer was passing. Additionally, the previous systems generally did not include any means for restraining the up and down motion of the wheel in the event that a harmonic displacement of the wheels came about from the travel over the surface. Additionally, replacement of a broken spring was very difficult and required considerable equipment designed more or less to handle such disassembly.

SUMMARY OF THE PRESENT INVENTION

The present invention is disclosed as a novel support system for the wheel assembly of a two wheel trailer which allows use of more flexible springs and yet increases the amount of weight which the trailer can carry. The present invention also permits most of the load weight to be carried by the wheel assembly and the support structure therefor and leaving the spring assembly to provide the cushioning effect for irregularities in the road.

BRIEF DESCRIPTION OF THE DRAWINGS

The present invention will now be illustratively described in a preferred embodiment which is not limited by the showing in the drawings.

DETAILED DESCRIPTION OF THE DRAWINGS

Figure 1:
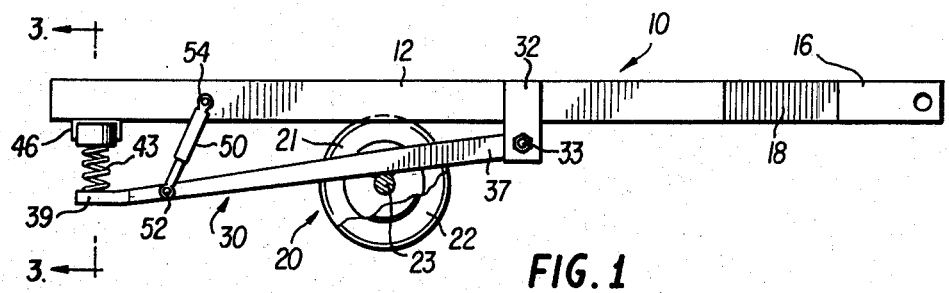
FIG. 1 is a side elevation view of one embodiment of a two wheeled trailer having the present invention installed thereon.

Referring now to the drawings, the present embodiment will be seen to consist of the trailer frame assembly 10, a wheel assembly 20 and a suspension assembly 30. The frame assembly 10 is illustratively shown as a rectangular frame having two parallel longitudinal members 11 and 12, and end braces 13 and 15 and a central cross brace 14. It also shows a tongue and hitch member 16 which may be formed by the two longitudinal members 11 and 12 being angled inwardly. Alternatively, the tongue members may be additional members 17 and 18 welded or bolted or riveted to the frame members 11 and 12. Alternatively, the tongue member could be a single member (not shown) attached to a member 16 and extending forward with a hitch at the end. Additional internal bracing is optional or may be required.

The wheel assembly consists of two wheels 21 and 22 mounted on an axle 23 and positioned in the center of the frame assembly, under the bracing member for the frame 14 in the drawings. Dual tandem wheel assemblies may also used for large trailers with the center of the tandem assembly positioned under the cross brace 14.

Figure 2:
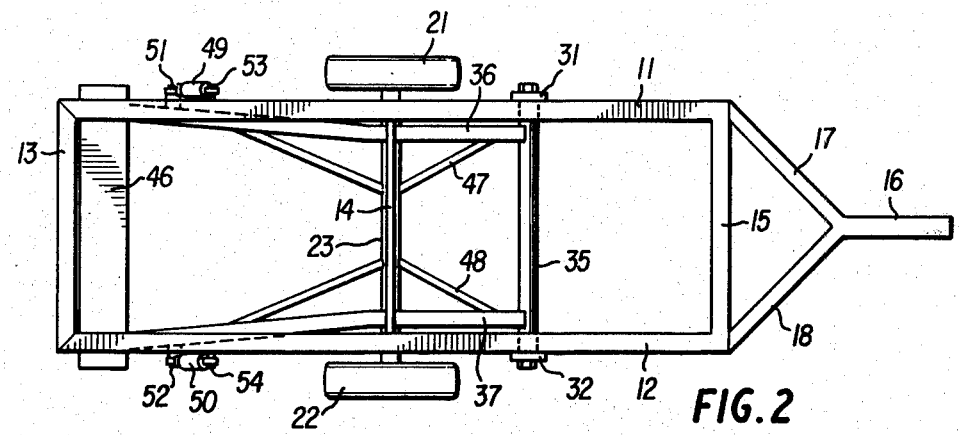
FIG. 2 is a top plan view of a trailer showing the novel wheel support system of the present invention.
Figure 3:
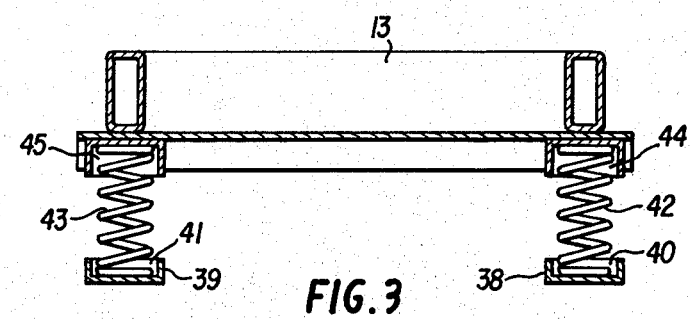
FIG. 3 is a partial sectional view of the present invention along the plane 3—3 in FIG. 1.
Figure 4:
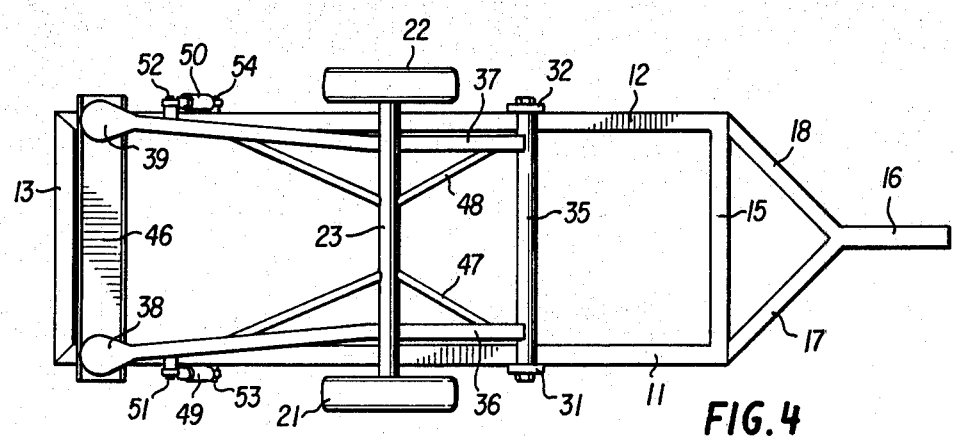
FIG. 4 is a bottom plan view of the invention shown in FIG. 2.

The wheel support assembly comprises mounting plates 31 and 32 secured to frame members 11 and 12 respectively. Pivotally attached to members 31 and 32 about a pin 33 is a suspension support unit comprised of housing 35, encompassing said support pivot pin to which housing are secured two longitudinal members 36 and 37 extending rearwardly to the axle 23 of the wheel assembly is welded to the underside of the longitudinal members 36 and 37 as can be seen in FIG. 4. As can be seen in FIG. 1 the longitudinal members 36 and 37 incline downwardly from the support plates 31 and 32 to the rear end portion of the trailer frame where these longitudinal members terminate in end portions 38 and 39 which will be seen to be parallel to the trailer frame when the trailer is in an unloaded position. End portions 38 and 39 of the longitudinal members 36 and 37 contain circular recesses 40 and 41 which hold the lower end of compression coil springs 42 and 43. The upper ends of compression springs 42 and 43 are received and retained within a circular annular well 44 and 45 which are secured to an inverted U shaped member 46. The longitudinal members 36 and 37 have V shaped bracing elements 47 and 48 which are attached to the longitudinal members ahead of and behind the wheel axle 23 as can be seen in FIGS. 2 and 4.

Completing the suspension system are shock absorbers 49 and 50 which are mounted in brackets 51 and 52 on the rearward portions of the support members 36 and 37 and are pivotally attached to the trailer frame members 11 and 12 at points 53 and 54.

Pressurized fluid suspension devices of air or liquid may be substituted for the coil springs as means to cushion the load against surface shocks.

It will be noted that the forward end portions of longitudinal members 36 and 37 are substantially parallel from the housing 35 to the axle 23 both as to their horizontal spacing and also as to their vertical depth. The reason for this is that as will be seen in this suspension system, the load on the trailer is carried by the axle and the axle for the wheels as well as the forward part of the suspension support system, that is from the axle forward to the housing 35. The portion of the longitudinal members 36 and 37 extending rearward from the axle 23 to the end portions 38 and 39 is of diminishing vertical depth.

It has been found that this system will be adequate to provide the necessary spring suspension for the load. It will also be noted that the portion from the longitudinal members 36 and 37 extending rearwardly from the axle 23 is angled outwardly to a degree depending upon the length of the trailer frame so that the end portions 38 and 39 are centered beneath the frame members at the point at which the spring system is attached. It should also be noted that the positioning of the spring suspension system is such that the distance from the spring suspension system to the axle 23 of the trailer wheels is twice the distance from the axle of the trailer wheels forward to the positioning of the support plates 31 and 32. By this positioning of the forward part of the suspension support system, that is the pivoting of the longitudinal members 36 and 37 about pivot pin 33 the entire load on the trailer is carried by the axle and the support plate, thus leaving the spring suspension portion of the assembly to act primarily to cushion the load as the trailer is moved along a surface.

The present invention is advantageous over previous attempts to provide suspension systems in that as the load is placed on the trailer, the trailer body and frame moved downwardly against the action of the springs 42 and 43. Additionally, should one of the coil springs break, replacement is simplified in that it is only necessary to jack the trailer frame up sufficiently to permit the damaged spring to be removed and a new one inserted in its place and the trailer lowered back down on the damaged spring. Minor modifications in design may be made to the illustrative embodiment as will occur to those with experience and skill in the art but will remain within the scope of the present invention as defined in the claims.

I claim:

1. A wheel suspension assembly for a trailer having a base frame of longitudinal side members, front and rear end braces, a central cross brace and towing means attached to said front end brace, said wheel suspension assembly comprising: a pair of depending support plates, the upper end portion of each to be attached to said longitudinal side members of said trailer frame, the lower depending end portions being interconnected by a fixed pivot pin; a substantially rectilinear support frame having its forward end pivotally mounted on said pivot and extending rearwardly under said trailer frame to a position beneath the rear end brace thereof to support load cushioning means which will interact with said rear end brace of said trailer frame; and at least one two-wheel-axle assembly secured to said support frame at a position which is one-third the length of said support frame from said forward end of said frame and below said support frame to transfer carried weight to said axle of said axle assembly extending beyond said longitudinal side members to position said wheels of said axle assembly outside said trailer frame; said wheel suspension assembly being attached to said trailer base frame at a position wherein said wheel-axle assembly is under the longitudinal center of said trailer base frame.

2. The assembly according to claim 1 wherein said support frame comprises: a housing surrounding said pivot pin; a pair of elongated support members of generally rectangular cross-section, each member having one end thereof fixedly attached to an end of said housing, said so attached support members to be positioned below and interiorly of the longitudinal side members of said trailer frame, the other end of each said member terminating in a flat form with a recess to receive one end of load suchioning means; and a pair of opposing, elongated V-shaped braces secured to the respective interior surfaces of said elongated members at their ends and attached to said wheel assembly at their vertices.

3. The assembly according to claim 1 wherein said load cushioning means comprises: a pair of resilient means selected from the group of coil springs and pressurized fluid support devices; an elongated member to be secured to and on the underside of said rear end brace of said trailer frame in a position which is directly above the rear end of said support frame and having a depending cup-like means on the under side of said elongated member to receive the upper end of one of said resilient means; and a pair of shock absorbers, each having one end connected to the rear portion of said support frame adjacent its respective resilient means, the opposite end of each shock absorber to be connected to a respective side member of a trailer.

4. The assembly according to claim 2 wherein the foreportion of each elongated support member is of uniform thickness from said housing to the point for attachment of said axle assembly and being parallel over this distance, the rear portion of each member thereafter extending rearwardly and outwardly at an angle which will position the flat form of each rear end of each member directly below each longitudinal side member of a trailer, each said rear portion diminishing in height to that of said flat terminating form.

* * * * *